(12) United States Patent
Torgersrud et al.

(10) Patent No.: US 9,432,504 B2
(45) Date of Patent: *Aug. 30, 2016

(54) CENTRAL CALL PLATFORM

(71) Applicant: Intelmate LLC, San Francisco, CA (US)

(72) Inventors: Richard Torgersrud, San Francisco, CA (US); Grant Gongaware, Alameda, CA (US)

(73) Assignee: INTELMATE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/642,367

(22) Filed: Mar. 9, 2015

(65) Prior Publication Data

US 2015/0244858 A1 Aug. 27, 2015

Related U.S. Application Data

(63) Continuation of application No. 12/826,153, filed on Jun. 29, 2010, now Pat. No. 8,976,949.

(51) Int. Cl.

| H04M 3/00 | (2006.01) |
|---|---|
| H04M 3/42 | (2006.01) |
| H04M 3/51 | (2006.01) |
| H04M 7/12 | (2006.01) |
| H04Q 3/00 | (2006.01) |
| H04M 3/38 | (2006.01) |

(52) U.S. Cl.
CPC ............. *H04M 3/4234* (2013.01); *H04M 3/38* (2013.01); *H04M 3/4228* (2013.01); *H04M 3/51* (2013.01); *H04M 7/1205* (2013.01); *H04Q 3/0029* (2013.01)

(58) Field of Classification Search
CPC combination set(s) only.
See application file for complete search history.

(56) References Cited

U.S. PATENT DOCUMENTS

| 5,917,897 A * | 6/1999 | Johnson ................. H04L 12/14 379/114.02 |
| 5,926,533 A * | 7/1999 | Gainsboro .......... H04M 3/2281 379/188 |
| 6,249,801 B1 * | 6/2001 | Zisapel ................... G06F 9/505 718/105 |
| 6,810,114 B2 * | 10/2004 | Welfley ............. H04M 3/53325 379/201.12 |
| 2002/0055906 A1 * | 5/2002 | Katz ...................... G06Q 20/10 705/39 |
| 2005/0068907 A1 * | 3/2005 | Garg ................... H04L 67/1019 370/270 |
| 2006/0083171 A1 * | 4/2006 | Tanaike ............ H04L 29/06027 370/238 |
| 2006/0095477 A1 * | 5/2006 | Li .......................... G06Q 10/00 |
| 2007/0184903 A1 * | 8/2007 | Liu ......................... A63F 13/12 463/42 |
| 2010/0036903 A1 * | 2/2010 | Ahmad ............... H04L 67/1002 709/202 |
| 2011/0295927 A1 * | 12/2011 | Ralev .................. H04L 67/1034 709/203 |

* cited by examiner

*Primary Examiner* — Duc Nguyen
*Assistant Examiner* — Assad Mohammed
(74) *Attorney, Agent, or Firm* — Venable LLP; Jeffri A. Kaminski; Leslie A. Lee

(57) ABSTRACT

A system and method for providing telephone services to a secure facility from an external, centralized call platform. An embodiment of the system includes a call processing center that is external to the facility and includes a plurality of computer clusters, and is configured to route communications to and from a router located at the secure facility. Having a majority of the system located outside the facility reduces equipment requirements at each individual facility, improves security and uptime, and provides more efficient management and expansion of the call platform.

17 Claims, 2 Drawing Sheets

CENTRAL CALL PLATFORM

CROSS REFERENCE TO RELATED APPLICATIONS

This application is a divisional of co-pending U.S. patent application Ser. No. 12/826,153, filed on Jun. 29, 2010, entitled "Central Call Platform," and is herein incorporated by reference.

FIELD OF THE INVENTION

Embodiments described herein relate generally to centralized communications services, and more specifically to providing a centralized system for delivering telephone communications and related information across communications networks.

BACKGROUND OF THE INVENTION

Call platforms enable management and call processing for facilities managing large volumes of telephone calls. Call platforms have been used in secure facilities such as prisons and other government detention centers to enable communications between residents and people outside the facilities. Unfortunately, extensive call processing hardware must be located at each individual facility in existing implementations of these platforms.

Existing call platforms for secure facilities utilize standardized Private Branch Exchange (PBX) equipment, such as that used in office telephone systems. These systems, however, do not provide the specific functions required for communications in secure facilities, including live call monitoring, forced call termination, and enhanced load balancing. Additionally, standard PBX software allows only minimal audio recording functionality, and limited archival capabilities. PBX implementations lack redundancy or fail over capabilities, and are limited in storage and service capacity. They also require the installation of specialized equipment for the recording of calls, and call processing is performed on-site using dedicated equipment.

Another issue is that PBX systems must be deployed individually for each facility. Management and access to these systems is dispersed, often requiring multiple physical computers and other hardware dedicated to each served institution. Some so-called "Offsite" or "Multi-Facility" solutions exist, but they are not centralized across facilities, and typically involve a traditional on-site communications system that is extended to an off-site facility only superficially. These systems simply include a communications link between the facility and another location storing the traditional equipment.

Secure facilities, by their nature, are typically located in remote locations and are not well suited for hosting call processing hardware. There are problems with cooling, dust, and power regulation that often cause increased hardware failure. In addition, repair staff must travel to the facility with replacement hardware before the facility can be brought back online. Thus, there exists a need for a centralized call platform for use at secure facilities that requires a minimum of facility-hosted equipment while also providing the advantageous features of a centralized platform.

DETAILED DESCRIPTION OF THE INVENTION

Embodiments described herein address the problems with current call processing systems used for secured facilities. The described embodiments provide a central call platform that provides unique features required by secure facilities. Though embodiments are described with reference to secure facilities such as prisons or government detention facilities, the embodiments described herein can be implemented in any facility in which the centralized features of the embodiments are desirable. It should be understood that embodiments of the invention are not limited by the example embodiments described herein and that changes can be made thereto. Example embodiments are now described with reference to the accompanying figures wherein like reference numbers are used consistently for like features throughout the drawings.

Figure 1:
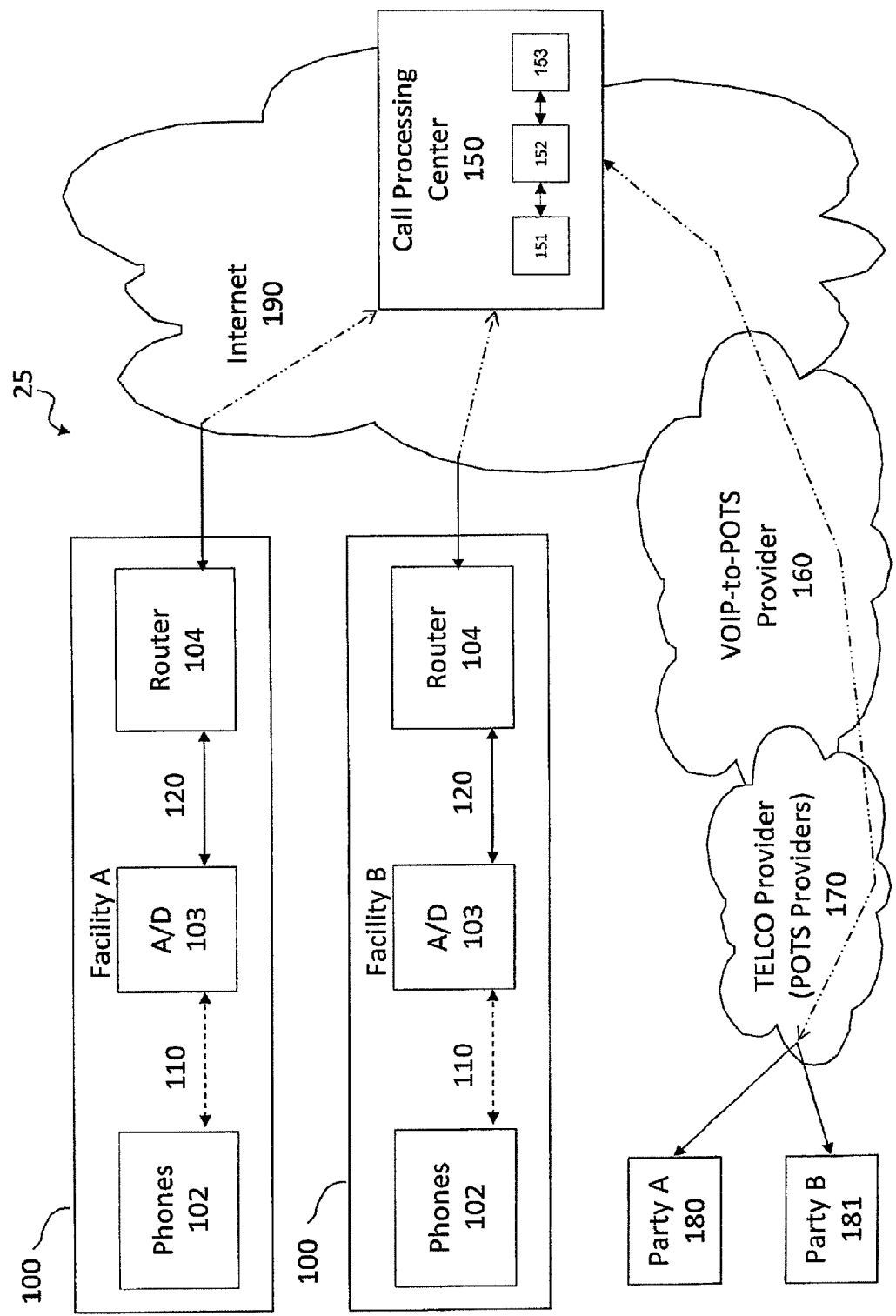
FIG. 1 illustrates an embodiment of the central call platform.

FIG. 1 illustrates an embodiment of an example a central call platform 25. The platform 25 includes a call processing center 150 connected to one or more facilities 100 through a network such as, e.g., the Internet 190. Facilities 100 may be any facilities requiring telephone service, especially those with security requirements and a large call volume, including secure facilities such as prisons or other government detention facilities. At each facility 100, there are telephones 102 that may be standard telephones connected using traditional telephone communications links 110, such as full duplex wiring for voice communications used in the "plain-old telephone service" ("POTS") standard. Alternatively, the telephones 102 could be digital telephones that communicate over a digital network or communication link, for example using an Ethernet connection and a power source provided by a standard outlet or as Power-Over-Ethernet. In the FIG. 1 example, the telephones 102 are analog and communicate via POTS.

Each telephone 102 at the secure facility 100 is connected to an analog-to-digital ("A/D") converter 103. A/D converters 103 convert an analog signal (such as a POTS signal) to a digital signal for transmission over digital networking links 120 (such as, e.g., Ethernet connections). The A/D converters 103 may, for example, be ADTRAN Total Access 900 series single T1 IP business gateways designed for carrier VoIP networks. The A/D converters 103 may output a signal using proprietary protocols for voice communications, or may use standard protocols, such as voice over IP (VoIP) protocols Session Initiation Protocol ("SIP"), Inter-Asterisk eXchange ("IAX"), and Real-time Transport Protocol ("RTP").

The A/D converters 103 are each connected to a router 104 via a networking link 120. The routers 104 are configured to communicate with the call processing center 150, which may be distributed across several locations. The routers 104 each connect the communications received via the A/D converters 103 to the Internet 190, and exchange IP (Internet Protocol) packets bidirectionally between the call processing center 150 and facility 100.

The telephones 102, A/D converters 103, and routers 104 may all be physically located at a facility 100. Calls placed from a facility telephone 102 are converted by the A/D converters 103 and transmitted via the routers 104 to the call processing center 150. The call processing center 150 includes application hardware and software for call processing and other functions described below.

The call processing center 150 is a system that is distributed across multiple clusters 151-153, which may or may not be geographically diverse (described below in more detail). Each cluster 151-153 hosts multiple nodes, including an application node, a database node, and a call processing node (discussed below in relation to FIG. 2). The clusters 151-153 communicate with each other via the Internet or dedicated connections, and information in any database node can be shared among the clusters 151-153. Data storage and retrieval can be performed across several clusters. The clusters 151-153 can also provide fail-over for one another, and routers 104 at each facility may be configured to communicate with another cluster if a primary cluster is unavailable. Similarly, resources of the nodes within a cluster (which may include multiple computers) can be reallocated as processing needs require.

The call processing center 150 routes telephone calls from facility telephones 102 to their ultimate destinations 180, 181. To accomplish this, the call processing center 150 communicates via internet protocol to a "VoIP-to-POTS" provider 160, which converts VoIP communications to POTS communications. Example VoIP-to-POTS providers 160 include Paetech, Level 3, and Verizon. After converting the VoIP signal to a POTS signal, the VoIP-to-POTS provider 160 provides the communication to a telecommunications provider 170 that routes the call to the called parties 180, 181.

The call processing center 150 may be in communication with multiple VoIP-to-POTS providers 160, and may route communications to any one of the providers 160 based on various factors including time-of-day, load, or rates. Similarly, the call processing center 150 or the VoIP-to-POTS provider 160 may route calls to various telecommunications providers 170 based on factors including time-of-day, load, or rates. For example, VoIP-to-POTS providers 160 often have connection limits. Therefore, the call processing center 150 may be configured to first attempt a connection to a primary VoIP-to-POTS provider 160 with a low rate for a given call destination. If that connection is refused, then the call processing center 150 would be configured to attempt connections to a second, and perhaps third VoIP-to-POTS provider 160 until a connection is established.

The call processing center 150 can also receive calls from outside parties 180, 181 and route the calls to facility telephones 102. The VoIP-to-POTS provider 160 may convert the POTS signal to a VoIP signal before the communication is sent to the call processing center 150. Alternatively, although not shown in FIG. 1, the outside callers 180, 181 may place a call using the traditional telecommunications provider 170 and may be directly connected to the call processing center 150 where the signal is converted using an A/D converter similar to the A/D converters 103 used at the facilities 100. The call processing center can connect outside callers 180, 181 to residents and can also allow outside callers 180, 181 to leave voicemail messages.

When an outside caller 180, 181 is connected to a call processing center 150, they are presented with an interactive voice response (IVR) system, which is a computerized system that plays recordings prompting users to input information via voice, telephone touch tones, or other available input methods. The call processing center 150 uses the automatic number information (ANI) within the call, similar to caller ID, to identify the outside caller 180, 181, and any resident associated with that caller. The call processing center 150 associates residents with an outside caller 180, 181 when a resident calls the number, or when an outside caller 180, 181 adds funds to a resident's account.

The IVR system of the call processing center 150 asks an outside caller 180, 181 if they would like to leave a voicemail or call the resident associated with the callers caller ID. If there are no associated residents, then the outside caller 180, 181 may be transferred to a customer service operator, who will assist them. If more than one resident is associated with a caller, the IVR system enables selection of a particular resident.

If an outside caller indicates that they wish to place an incoming call, the call processing center 150 checks criteria including: (1) whether the facility allows incoming calls; (2) whether calls are allowed at the present time; (3) whether the resident has permission to receive incoming calls; (4) whether the outside caller 180, 181 has permission to call the particular resident; (5) whether the system knows the current location of the resident; and (6) whether the caller has sufficient funds to complete the call. If the criteria fail, the caller is notified via IVR, and a reason for failure may be noted. The outside caller 180, 181 may then be asked to leave a voicemail. If the call fails due to insufficient funds, the caller may be asked to add funds.

If the call is allowed, the call processing center 150 will connect to the facility 100 via the Internet 19, and will play a distinctive ring on a telephone 102 in the resident's current location. The ring may be one of multiple different available rings, and each resident may be assigned a different ring. If all phones are in use, the outside caller 180, 181 will hear an IVR message notifying them that all phones are currently in use, and they will be asked to leave a voicemail message.

If a phone in the resident's location is answered, a message will play for the resident requesting that the resident enter their unique personal identification number (PIN) (e.g., "This is an incoming call for <NAME>. If you are <NAME> please enter your PIN now."). The message plays for a predetermined amount of time (e.g., 60 seconds) and if the PIN number is not entered correctly in this time, the message will terminate and the outside caller 180, 181 will be asked if they wish to leave a voicemail. If the telephone 102 is placed back on hook, the incoming call is terminated and the outside caller is asked if they wish to leave a voicemail. If the resident successfully keys in their PIN and passes a secondary voice verification step (which matches the resident's voice with a pre-recorded voice ID), the outside call is connected.

All incoming calls are processed through the same call processing center 150 as an outgoing call. This enables the enforcement of all existing rules regulating resident communications at each facility, such as recording, monitoring, time limits, schedule, and three way call detection. The call processing center 150 allows incoming calls to be completed at rates that are the same as outgoing calls, or different, depending on facility preference or other factors.

The use of a call processing center 150 allows one incoming number to be used to call any resident at any facility that allows the feature. An outside caller 180, 181 that communicates with multiple residents at multiple facilities is able to make calls to, and leave voicemails for, any resident by calling the same number. The system can be configured to prevent abuse and fraud by, for example, only allowing residents who have contacted a destination number to receive calls from that number.

The call processing center 150 can be configured to log all attempts to reach a resident via an incoming call even when a call does not succeed. These attempts can be associated both with the resident's record and with the outside caller's record. This enhances security and facilities investigations. Incoming calls can be set to trigger alerts just as outgoing calls can, allowing investigators to be notified if a particular outside caller 180, 181 attempts to contact a resident, or if a resident receives and incoming call.

Figure 2:
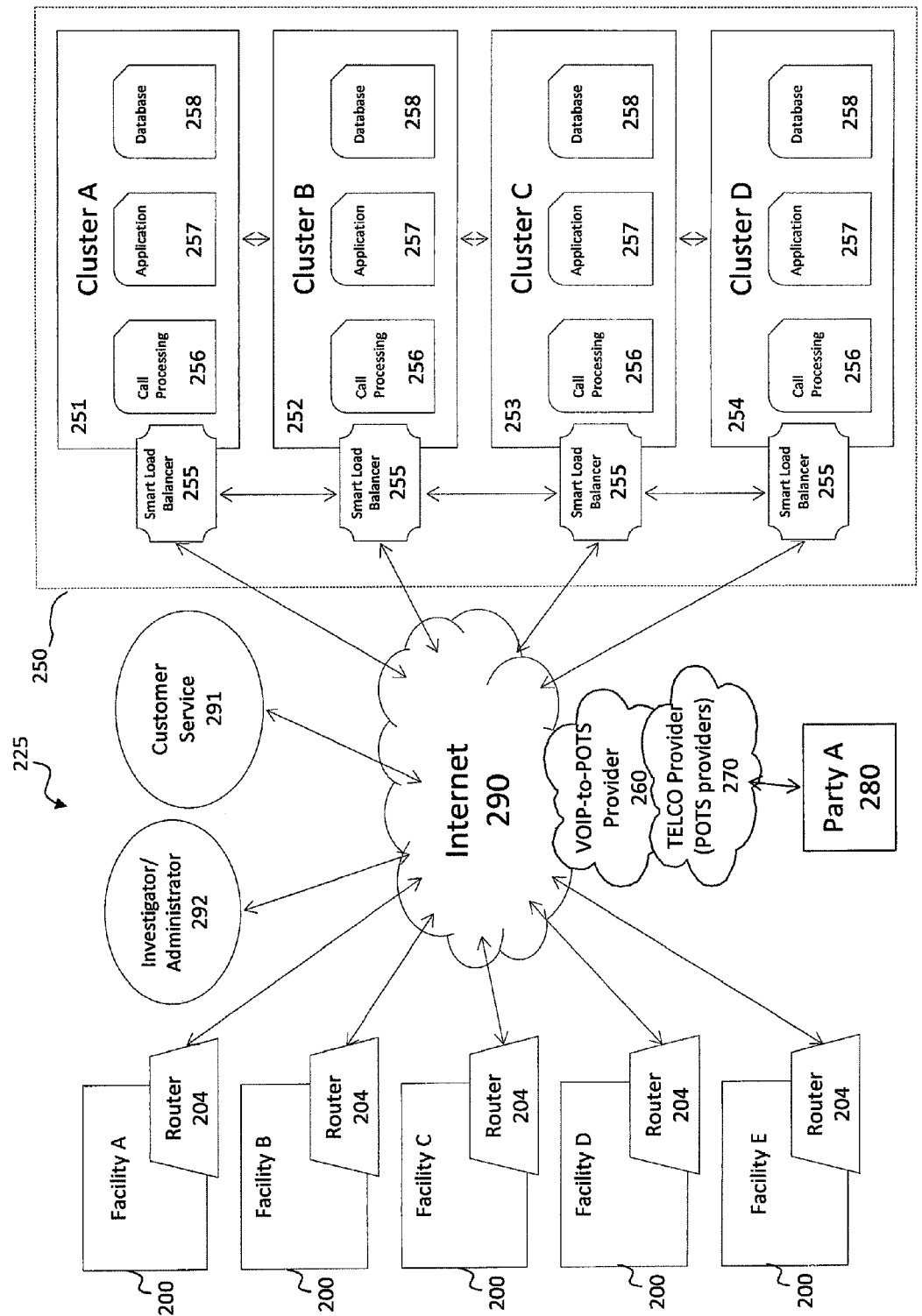
FIG. 2 illustrates the organization and interaction of clusters of a central call platform.

FIG. 2 is a system diagram showing the organization and interaction of clusters of another example central call platform 225. FIG. 2 illustrates multiple facilities 200, each connected to the Internet 290 via a router 204. The facilities 200 communicate, via the Internet 290, with a call processing center 250 that is made up of multiple call clusters 251-254.

FIG. 2 illustrates a first call processing cluster 251 in location A, a second call processing cluster 252 in location B, a third call processing cluster 253 in location C, and a fourth call processing cluster 254 in location D. The call processing clusters 251-254 together operate as the call processing center 250, and each cluster may include one or many computers functioning together to perform various tasks. The call processing clusters 251-254 may be located in different geographic regions, and one or more of the call processing clusters 251-254 may function as backup clusters or overflow clusters, operating only when other clusters are unavailable or overloaded.

The routers 204 at each facility 200 may be configured to route communications for a particular facility to a predetermined call processing cluster, and may be set to route communications to another call processing cluster if the predetermined call processing cluster is unavailable. Alternatively, the routers 204 may be configured to distribute communications across multiple processing clusters according to a predetermined ratio (described below). These two configurations may be used alternatively or in conjunction with one another, and their use could be determined based on the traffic load on a network.

The routers 204 may also be configured to route communications over multiple outbound network connections at each facility 200. The router 204 may be configured to use a second network connection when a first network connection is unavailable. For example, a facility may be serviced (i.e., communication with the outside world) by a DSL line and a T1 line, and the DSL line may be used as a backup when the T1 line becomes unavailable. As mentioned above, a router 204 may also be configured to distribute communications across multiple network connections according to a predetermined ratio. For example, if a facility is serviced by multiple T1 lines, the router 204 may be configured to distribute the call-data load across the T1 lines to a single cluster, or multiple clusters, allowing a large capacity of calls to be carried simultaneously. These configurations may be used alternatively or in conjunction with one another, and their use could be determined based on the traffic load on the network.

Each call processing cluster 251-254 includes multiple nodes each performing various functions. A call processing cluster may be one computer that is divided into virtual servers, each of which is treated as a node in the cluster. Alternatively, each node may be a dedicated computer, or multiple computers can form each node. Servers can be added as necessary to increase capacity of the cluster.

An example cluster for use in a secure facility is now described. Secure facilities, such as prisons, have unique features that must be addressed by the central call platform 225. For example, residents have limited access to cash, and so the central call platform provides various ways of paying for telephone access. An account is established for each resident, and funding of the account is provided via kiosks, calling cards, and an interactive voice response system. Provisioning for outside funding may also be desirable. Accordingly, the platform 225 may provide for funding of an account by an outside party via live customer service, an interactive voice response system, a website, or kiosks in visiting areas of the facilities.

The central call platform 225 may also allow collect calls to be placed by residents. A common problem with collect call systems is that, because a called party may not recognize the number or know what individual from the facility is calling, there must be a way for a resident to identify themselves. In traditional collect call systems, an individual may be allowed to record their name to be played to a called party. This, however, can permit the transmission of a short message without payment for use of the system. Accordingly, the call platform 225 may instead retrieve and play an audio clip of the inmates name that was recorded under supervision, or that was recorded by another party, or generated by a voice synthesizer.

System accounts must be tied to particular facility residents and must be only accessible by those facility residents. To accomplish this, the platform 225 may require a resident, upon accessing the system, to enter a unique PIN number that is associated with the resident. Additional PIN numbers may be required to access voicemail or other secure features. The central call center 250 may also include voice recognition features, requiring a resident to state its name to authenticate his/her identity.

Secure facilities also often place restrictions on the communications of residents. Accordingly, the central call platform 225 is able to automatically restrict a resident from making calls to certain numbers based on restrictions noted in the residents' accounts. Similarly, the central call platform 225 prevents outside callers from leaving voicemail messages for inmates that are restricted from communicating with the outside caller. The central call platform 225 may also place time limits on calls, and may include audio warnings that a call may be cut off due to time restrictions.

Secure facilities also require call logging and monitoring capabilities. The logging may include storing information such as when the call was made, to whom, and how long the call lasted. Full audio recording of calls may also be necessary in prisons, for example, where virtually all calls need to be recorded and retrieved by investigators. Investigators may also need to monitor live calls. These functions can be automated by the central call platform 225. The central call platform 225 may also be set to not record certain calls, such as calls between an inmate and his attorney. This can be automated by including attorney numbers on a "do-not-record" list for the system or resident's account or by providing an option to request that a call not be recorded via an interactive voice response system. The request may be reviewed by a live call operator for authenticity, or may be logged for further review to detect abuse.

Many of these features are implemented using an IVR system provided by the call processing center 250. A facility resident may, for example, add funds to an account, make a call using funds, make a collect call, leave messages for administrators of a secure facility or customer service, or access a voicemail inbox.

Each call processing cluster 251-254 includes a call processing node 256. The call processing node 256 hosts an automated operator, audio routing, and audio recording functionality. The call processing node 256 is also responsible for digital signal processing. The automated operator may be an IVR system. Audio routing and recording may be used to process and route calls to destination parties, or to record and retrieve voicemail messages or call records. The call processing node 210 may be one or many computers functioning together to form the node.

The call processing node 256 is responsible for routing calls to telecommunications providers 270. A distributed carrier system allows clusters to access multiple VoIP-to-POTS providers 260 and telecommunications providers 270 to terminate any call. If one carrier is overloaded, the call processing node 256 will seek the next available carrier based on a set of predefined rules that govern priority. Priority can be set based on factors such as rate, time of day, call termination point, and carrier load. The call processing node 256 may optionally track the number of connections sent to a single carrier, and automatically route calls to a different carrier based on the carrier load. Call processing administrators can adjust the priority at any time via a single, dedicated interface.

Each call processing cluster 251-254 includes an application node 257. The application node 257 hosts payment validation, security, user interface, and business logic functionality. Business logic functionality includes all the rules governing a call. This could include, for example, fraud prevention and protection, schedule limits defined per resident, facility, phone, or destination number, or alarms for triggering investigation. The application node 257 is also responsible for implementing rules related to call acceptance, blocking, and recording. The application node 257 can be accessed by authorized users via a web page. By accessing the application node, administrators and investigators 240 can retrieve recorded calls, and can review records and adjust settings, such as calling or voicemail permissions for facility residents. Customer service personnel 241 can also use a web page to review issues reported by facility residents or outside callers. The application node 257 may be one or many computers functioning together to form the node.

Each call processing cluster 251-254 also includes a database node 258. The database node hosts settings for the business logic functionality. The database node 258 also stores indexed call logs, call recordings, voicemail recordings, and settings for individual residents and facilities. The database node 258 may be one or many computers functioning together to form the node. The database nodes 258 at each call processing cluster 251-254 may replicate some or all of the data at another database node. Since some facilities may impose rules regarding the geographic location where their data is stored, the call processing cluster 251-254 may include rules that define the data that the databases will replicate for each facility.

Call processing clusters 251-254 are connected to a communications network and to one another via smart load balancers 255. The smart load balancers 255 may be configured to communicate with one another over the Internet or through a dedicated communications network or link. The smart load balancers 255 may be configured to communicate to periodically update status information stored at each smart load balancer. The smart load balancers 255 can accordingly redirect incoming communications received from routers 204 based on the availability or load on a particular call processing cluster, and can redirect outgoing communications based on the responsiveness of a provider network.

Call processing clusters 251-254 can also share and retrieve data from one another directly via a communications link or over the Internet. For example, if a user at Facility A makes a request for voicemail, and the request has been routed to call processing cluster 251, but the actual recording is stored on call processing cluster 252, cluster 251 can retrieve the audio from cluster 252 for playback. Similarly, an investigator listening to call recordings via the web site interface can be communicating with the application node 257 using any call processing cluster 251-254 and can retrieve call recordings from any cluster. Voicemail and call recordings can be stored at multiple geographically diverse locations and may be backed up at separate locations for redundancy. A call processing cluster 251-254 can identify a storage location of call data by referencing a cluster identifier that is included with each piece of call data in a database node 258. Accordingly, the databases storing audio do not need to be replicated across clusters (though they can be).

The multiple call processing clusters 251-254 provide full cluster fail-over. That is, if one of the call processing clusters 251-254 fails, the routers 204 at the facilities are configured to automatically seek and connect to another cluster. Similarly, the smart load balancers 255 are configured to redirect incoming and/or outgoing communications when a particular cluster 251-254 is unavailable or nonresponsive. In both instances, the other cluster can take over call processing duties and allow communications to continue. Using multiple computers at each node of a cluster ensures that, if a single node in the cluster fails, another node can take over all of the functions of the failed node. Resources of a node in a cluster may be reallocated based on processing requirements. This all happens seamlessly without affecting configurations at the facilities 200 or the routers 204.

The described central call platforms include numerous advantages over existing platforms. The described platforms require minimal facility-hosted equipment, generally limited to the telephones themselves, an A/D converter, and a router or VoIP gateway. The router or VoIP gateway can reroute all audio originating or terminating at the telephone to the central call platform.

By removing the call processing center 150, 250 from the facility 100, 200 and distributing it across multiple clusters, sensitive computer hardware can be housed in special environmentally controlled and secure hosting environments that may be geographically dispersed. Clusters of computer hardware can operate independent of one another, allowing for redundancy and failovers. If a cluster completely fails, another functional cluster can take over all computing processes. Additionally, an individual cluster is redundant within itself, so that should any node of the cluster fail, resources can be reallocated to perform the required functions of the node.

Computing clusters can handle large volumes of call traffic from multiple locations more effectively than non-cluster solutions. This is a result of clusters being able to adapt to call load and expand capacity as needed. The resources within a cluster 251-254 can also be adjusted dynamically as service needs require. For example, if a call processing node 256 becomes overloaded, resources can be redirected from another node. This applies across clusters 251-254 as well; if a cluster starts to come under heavy load or become nonresponsive, connected clients can be shifted to a different cluster.

Multiple clusters also facilitate maintenance and expansion, as they allow operations at a single location to be interrupted for planned or unplanned servicing without bringing down communications. Clusters allow near limitless scalability as service needs expand. This can be accomplished by increasing computing capacity of the cluster, with no downtime. This also leads to hardware cost savings as service capacity can be increased with minimal hardware investment. Services within a cluster can be upgraded, or computing capacity added without affecting service availability. Higher uptime results in enhanced revenue. Fast replacement and maintenance is facilitated by having service personnel and replacement equipment in close proximity to a small number of cluster locations.

The above description and drawings are only to be considered illustrative of specific embodiments, which achieve the features and advantages described herein. Modifications and substitutions for specific conditions and materials can be made. Accordingly, the embodiments are not considered as being limited by the foregoing description and drawings, but is only limited by the scope of the appended claims.

What is claimed is:

1. A system for providing telephone services to a secure facility, the system comprising:
    a call processing center that includes a plurality of computing clusters, the call processing center being configured to route voice communications to and from a router located at the secure facility and a selected computing cluster;
    each of the computing clusters comprising:
        at least one database node comprising a database that stores a plurality of recordings of telephone calls and voicemail messages;
        a call processing node configured to route the voice communications from a destination telephone to a selected one of a plurality of telecommunications carriers, wherein the one selected telecommunications carrier is selected based on a set of predefined rules that govern priority; and
        an application node configured to provide a plurality of authorized users access to the plurality of recordings at any of the plurality of computing clusters,
    wherein the plurality of computing clusters are geographically dispersed at a plurality of geographic locations, and
    wherein the call processing center stores a cluster identifier associated with each database node and stores information regarding the plurality of geographic locations where data regarding the voice communications can and cannot be stored.

2. The system of claim 1, wherein the call processing node is configured to route received voice communications to and from the destination telephone.

3. The system of claim 1, wherein the set of predefined rules that govern priority are one or more of rate, time of day, call termination point, and carrier load.

4. The system of claim 1, wherein the call processing node is configured to track a number of voice communications routed to a first telecommunications carrier, and route voice communications to a second telecommunications carrier based on the number of voice communications routed to the first telecommunications carrier.

5. The system of claim 4, wherein the first telecommunications carrier is the one selected telecommunications carrier.

6. The system of claim 1, wherein the database node of each computing cluster is configured to replicate some or all data at another database node.

7. The system of claim 6, wherein at least one computing cluster includes a rule to define the geographic location where some or all data is replicated.

8. The system of claim 1, wherein the application node includes logic functionality, wherein the logic functionality includes one or more of fraud prevention and protection; schedule limits defined per resident, facility, phone or destination number; and alarms for triggering investigation.

9. The system of claim 1, further comprising a load balancer, wherein the computing clusters are connected to each other via the load balancer.

10. The system of claim 9, wherein the load balancer is configured to redirect voice communications from the router based on availability of or load on a computing cluster.

11. The system of claim 9, wherein the load balancer is configured to redirect outgoing voice communications from the router based responsiveness of a telecommunications carrier.

12. The system of claim 9, wherein the load balancer is configured to redirect voice communications to or from the router based on unavailability or nonresponsiveness of the selected computing cluster.

13. The system of claim 9, wherein the load balancer is a plurality of load balancers.

14. The system of claim 13, wherein the load balancers are configured to communicate with each other.

15. The system of claim 13, wherein each load balancer is configured to store status information.

16. The system of claim 15, wherein each load balancer is configured to communicate to update the status information stored at each load balancer.

17. The system of claim 1, wherein the router is configured to seek and connect to another computing cluster if the selected computing cluster fails.

* * * * *